Patented Dec. 27, 1938

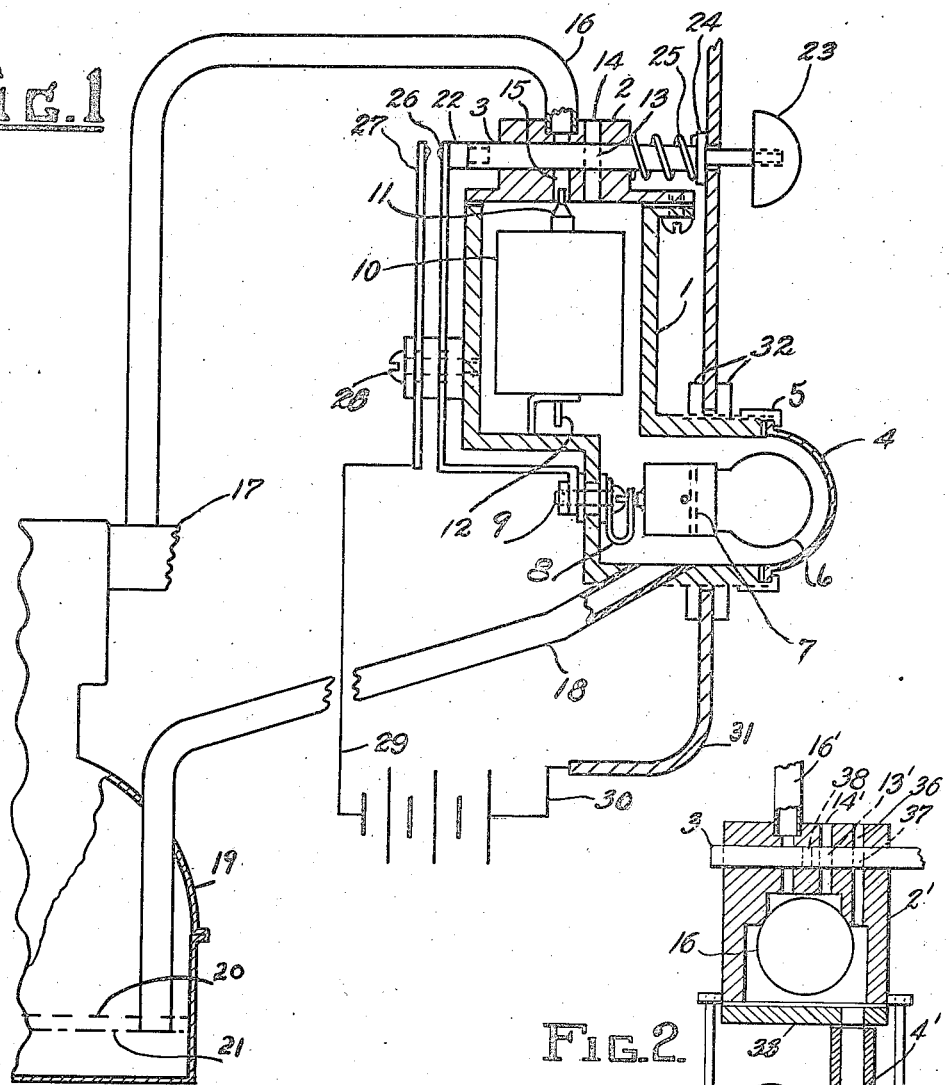

2,141,325

UNITED STATES PATENT OFFICE 2,141,325

LIQUID LEVEL INDICATING DEVICE

John F. Werder, Lakewood, Ohio

Application August 31, 1937, Serial No. 161,804

5 Claims. (Cl. 116—118)

This invention relates to liquid level indicating devices for use on automobiles, trucks, buses, aeroplanes, etc.

The objects of the present invention are, first, to make a liquid level gauge which cannot indicate the presence of a sufficient supply of liquid unless such supply actually exists; second, to indicate visually the color or condition of the liquid; third, to enable the operator of a vehicle or aeroplane to determine the safe quantity or quality of such liquid while driving or flying.

Still further objects will appear from the following description and claims when considered together with the accompanying drawing.

Many oil indicating devices of all types have been made and even put on vehicles as standard equipment for a limited length of time. However, any mechanical, hydrostatic or electrical device is subject to failure. In the event of failure of any device to indicate the lack of a safe quantity of oil in a crankcase, serious damage to the motor would result. Likewise failure of a device to show a deficiency of water in the cooling system could cause serious damage. The same difficulties occasionally happen with the gasoline gauges which are now standard equipment on most automobiles. Failure of the gasoline gauge on a car merely results in inconvenience—it never damages the motor. However, failure of the gasoline gauge on an aeroplane is a very serious matter—often apt to result in loss of life.

One of the most important features of my device is that it cannot indicate the presence of a safe quantity of oil in the crankcase, water in the radiator, or other liquid level unless such oil, water or other liquid is actually there. It is, of course, to be understood that various difficulties can arise with my device which will keep it from functioning properly but in this case the device will always tell the operator that he needs oil, water or other liquid which error will be quickly found out when checked in the conventional ways. Even if the oil level, for example, is not checked and oil is added when not needed, it will not injure the motor.

Also it is now pretty well conceded that crankcase oil need not be changed in all motors after running a fixed number of miles. With my device the proper time for changing oil can be quite safely determined by the appearance of the crankcase lubricant which is clearly shown every time the oil level is checked. In some cars, for example, the oil will remain relatively clean and clear for 1000 or 1500 miles. In others it will be contaminated with carbon, road dust and sludge after 600 or 500 or even less miles of operating.

Fig. 1 is a diagrammatic view of my device attached to the dash board. Fig. 2 is a diagrammatic view of a modified form of my device. The view of my device itself is partly in section and is approximately full size. The partial view of the motor is, of course, drawn to a much smaller scale.

1 is the case and 2 is the cover in which is located slide valve 3. 4 is a transparent window preferably of glass which is held to the body by nut 5. 6 is electric light bulb which is held in place by two projections 7 (one shown in dotted lines) and the tension of contact spring 8. 9 is a bolt which is insulated from the case by suitable bushings.

10 is a float to one end of which is attached valve 11 and the other end a pin 12 which keeps the valve in proper alignment. 13 indicates port in slide valve 3 and 14 port in cover.

15 is a central port in the cover which is connected with vacuum line 16. 17 is the intake manifold on the motor and 18 is the oil channel running from the crankcase 19 to the very bottom of my device. Dotted line 20 represents the full level of the oil in the crankcase and 21 represents a lower level which is usually about one quart below the full level.

22 is a fibre or other type of insulating plug inserted in the end of valve 3. 23 is the operating button which together with sleeve 24 are both located on the end of valve 3. Spring 25 holds valve 3 in the normal closed position as shown in the drawing. 26 and 27 are contact springs held to the case 1 by bolt 28 together with suitable insulating bushings.

29 is a wire connecting the one side of the battery to contact spring 27 and 30 connects the other side of the battery to ground or dash board 31. 32 are lock nuts for holding the device in position on the dash board.

To illustrate the operation of my device let us suppose that the oil level in the crankcase is as shown in line 20 and the motor is running. Push button 23 is now pushed in to the dash board which brings port 13 in valve 3 in line with port 15 and at the same time establishes electrical contact between 26 and 27. The vacuum from the intake manifold of the motor 17 exhausts the air in case 1 and atmospheric pressure from the motor forces crankcase oil up in to case 1 completely covering light bulb and raising float 10. This closes port 15 and no more oil will flow into the case. The electric light 6 is burning and the oil is clearly visible through glass window 4. Upon release of the button 23 port 13 again lines up with passage 14 and closes port 15 shutting off the vacuum source and breaking the electrical connection. Air now enters case through port 14 and the oil returns to the crankcase by gravity.

Suppose, for example, that the oil level is lower than line 21 in the crankcase when this test is made. In this case no oil will be sucked up into pipe 18 because the lower end is not in contact with the oil. The operator is therefore advised that the oil level in his crankcase is low. It will be noted that this gauge is absolutely dependable and reliable in that it cannot show the presence of oil in the crankcase unless such oil is actually present and in quantities of a certain predetermined amount.

Like any other piece of equipment failure can occur which will prevent its functioning. For example, line 16 or 18 might become broken through vibration or other causes. In this case by pressing on button 23 no oil would appear through the window 4 and the operator would assume that he needed oil. Examination of the crankcase contents through the usual bayonette means might reveal the presence of sufficient oil but if such an examination were not made and additional oil added no particular damage would be done to the motor.

Float 10 might stick and hold valve 11 in port 15 which would also indicate to the operator that oil was needed. However, there is no possible way in which my device can show the presence of fluid unless such fluid is actually there.

Many changes will occur to anyone familiar with the art to which this pertains and I do not wish to limit my invention to the particular example herein set forth. Light bulb 6 together with all electrical connections can, of course, be eliminated. I prefer to use the light, however, because it clearly shows the condition of the oil. That is, a comparatively small amount of contamination will so darken the thin layer of oil laying between lamp bulb 6 and window 4 as to render it partially or completely opaque. Also the two-way valve 3 in cover 2 can be constructed in any number of different ways as also may be the electrical connections.

Float 10 together with its valve 11 is not absolutely essential. Its purpose is to prevent oil from the crankcase being sucked into the intake manifold in case the operator holds button 23 in for too long a period after the oil appears in window 4. Just the cavity now occupied by the float is in itself quite a protection because of the time required to fill this chamber after sufficient oil has been sucked into the case to be visible through window 4. In making this device without the float it is sometimes advisable to restrict the passage between the lamp chamber and the float chamber even more than shown in the drawing.

The same type of gauge can be applied to fuel tanks or radiators. It is, of course, necessary that the lower end of pipe 18 always be lower than the lowest part of the case itself so that the fluid will drain out of the gauge.

In my drawing I show vacuum pipe 16 connected to the intake manifold. Any other vacuum means can, of course, be employed.

In Fig. 2 I show a modification of my device. In this figure the cover 2' becomes the float chamber as well as a carrier and body for valve 3'. In place of the window I use a transparent tube 4' which may be either round, flat or any other shape so long as it leaves a channel through the center for the passage of liquid. The float 10' also becomes the valve and it will be noted that in the drawing it is in the raised or closed position. 36, 37 and 38 are additional ports in the cover and valve, the reason for which will be explained later. A cover 33 completes the float chamber and a cover 34 to which is attached fluid pipe 18' holds the whole assembly together by the use of bolts or other means.

In a construction of the sort shown in Fig. 2 I prefer to use a flat tube which gives the operator a view of the oil spread out in a thin layer. The half of this tube adjacent to the light may be frosted. The advantage of this is that it somewhat deflects the light from the bulb 6' during the interval in which the bulb is lit but no oil yet appears in the glass tube. This construction is less blinding to the operator when the device is used at night.

This same effect, of course, can be obtained in Fig. 1 by properly coating or shielding light bulb 6 itself.

In operation, as shown in Fig. 2, valve 3' is pushed to the left until port 38 registers with 15'. Ports 14' and 36 are then closed. Without liquid surrounding float 10' it then rests on 33 which permits the vacuum entering through pipe 16' to draw liquid through pipe 18' filling transparent tube 4'. As soon as this liquid raises in cover 2' sufficiently it will raise float ball 10' to the position shown in drawing and thus cut off the vacuum and stop the further flow of fluid. Upon release of valve 3' it returns to the position shown in the drawing which permits air to enter float chamber surrounding float. The liquid then flows out of pipe 18' in the usual manner. Float 10' might remain seated so air is also let in through port 14' and float will then drop as soon as the fluid has drained away from underneath it.

Many motors are now equipped with oil filters which are connected into the oil line and some of these really keep the oil clean for many miles. With the motor in good condition some filters will keep the crankcase oil clean and transparent for several thousand miles but with a motor in poor condition the oil will get dirty much quicker. Filters, to be efficient, cannot be changed on an arbitrary basis of so many thousand miles. When my gauge is used in connection with a filter the operator knows the moment his oil starts to get dirty and for this reason can change his filter at the exact time required. Such procedure materially increases the life and performance of any motor. Therefore my gauge not only enables the operator to know whether or not he has sufficient oil in his crankcase but he also is aware at all times whether or not this oil is clean or contaminated with foreign matter.

Having thus described the invention what I claim as new is:

1. In a liquid testing device, a case having two ports in the top thereof and in direct communication with the inside of said case, float valve means located inside said case for closing one of said ports, tubular means extending from and having open communication with the bottom of said case to liquid in a reservoir, a transparent window in the wall of said case, a source of vacuum, tubular means extending from and having open communication with the float controlled port to the vacuum source and manually operated valve means so disposed that when said manual valve is in one position, communication is established between said vacuum source and said float controlled port while said other port is closed to atmosphere so that liquid will be drawn into said case until said float rises and closes said float controlled port, and when said manual valve is in another position said communication to vacuum source is closed and said other port is opened to the atmosphere permitting liquid to drain out of case and return to said reservoir.

2. In a liquid testing device, a case having two ports in the top thereof and in direct communication with the inside of said case, float valve means located inside said case for closing one of said ports, tubular means extending from and having open communication with the bottom of said case to liquid in a reservoir, a transparent window in the wall of said case, a source of vacuum, tubular means extending from and having open communication with the float controlled port to the vacuum source and spring loaded manually operated valve means so disposed that when said manual valve is held against its spring, communication is established between said vacuum source and said float controlled port while said other port is closed to atmosphere so that liquid will be drawn into said case until said float rises and closes said float controlled port, and when said manual valve is in normal position said communication to vacuum source is closed and said other port is opened to the atmosphere permitting liquid to drain out of case and return to said reservoir.

3. In a liquid testing device, a case having two ports in the top thereof and in direct communication with the inside of said case, float valve means located inside said case for closing one of said ports, tubular means extending from and having open communication with the bottom of said case to liquid in a reservoir, a convex transparent window in the wall of said case, an electric lamp located inside said case and so aligned that a space is left between said lamp and window, a source of vacuum, tubular means extending from and having open communication with the float controlled port to the vacuum source and manually operated valve means so disposed that when said manual valve is in one position, communication is established between said vacuum source and said float controlled port while said other port is closed to atmosphere so that liquid will be drawn into said case until said float rises and closes said float controlled port, and when said manual valve is in another position said communication to vacuum source is closed and said other port is opened to the atmosphere permitting liquid to drain out of case and return to said reservoir.

4. In a liquid testing device, a case having two ports in the top thereof and in direct communication with the inside of said case, float valve means located inside said case for closing one of said ports, tubular means extending from and having open communication with the bottom of said case to liquid in a reservoir, a convex transparent window in the wall of said case, an electric lamp located inside said case and so aligned that a space is left between said lamp and window, a source of vacuum, tubular means extending from and having open communication with the float controlled port to the vacuum source and manually operated valve means so disposed that when said manual valve is in one position, communication is established between said vacuum source and said float controlled port while said other port is closed to atmosphere so that liquid will be drawn into said case until said float rises and closes said float controlled port, and when said manual valve is in another position said communication to vacuum source is closed and said other port is opened to the atmosphere permitting liquid to drain out of case and return to said reservoir, electric switch means attached to said case and actuated by said manual valve means so that it is closed when said manual valve is in the position establishing communication between said vacuum source and said float controlled port.

5. In a liquid testing device, a case having two ports in the top thereof and in direct communication with the inside of said case, float valve means located inside said case for closing one of said ports, a transparent tube, one end of which is attached to and has open communication with the bottom of said case, a conduit extending from the other end of said tube to liquid in a reservoir, a source of vacuum, a conduit extending from the float controlled port to the vacuum source and manually operated valve means so disposed that when said manual valve is in one position, communication is established between said vacuum source and said float controlled port while said other port is closed to atmosphere so that liquid will be drawn into said case until said float rises and closes said float controlled port, and when said manual valve is in another position said communication to vacuum source is closed and said other port is opened to the atmosphere permitting liquid to drain out of case and return to said reservoir.

JOHN F. WERDER.